Feb. 22, 1927. 1,618,720
W. M. MOORE
DRAW-OFF APPLIANCE FOR LIQUID CONTAINERS
Filed April 23, 1925
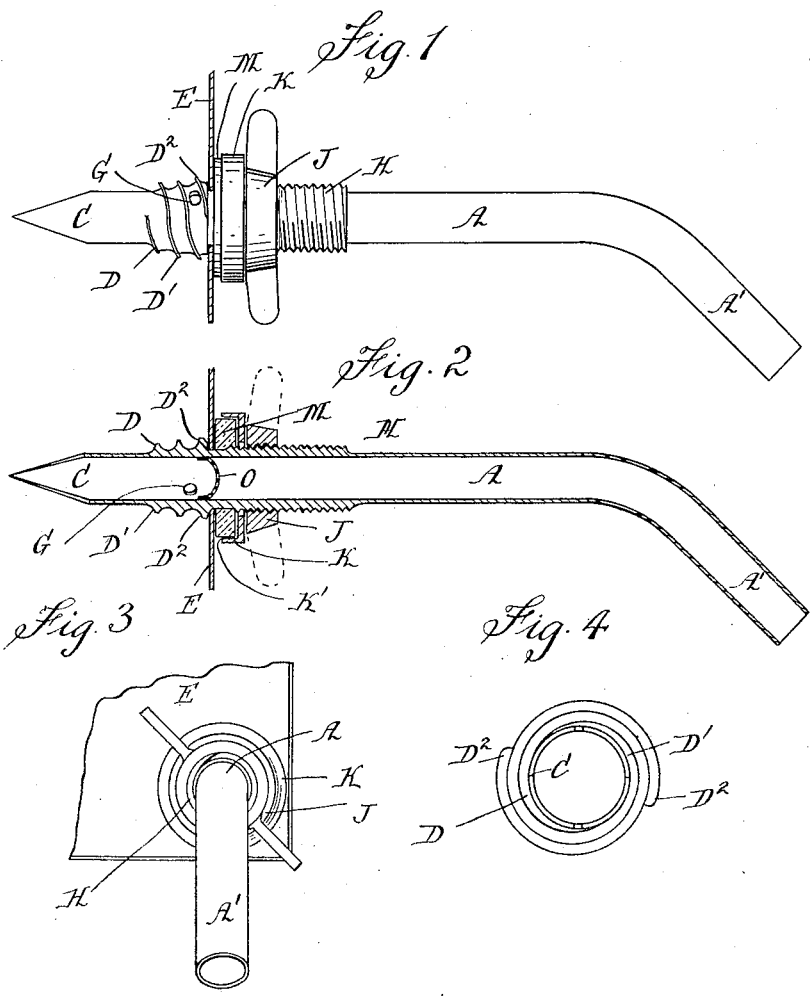
Inventor:
William Mark Moore
By
 Attorney Patented Feb. 22, 1927.

UNITED STATES PATENT OFFICE.

WILLIAM MARK MOORE, OF PALMERSTON NORTH, NEW ZEALAND.

DRAW-OFF APPLIANCE FOR LIQUID CONTAINERS.

Application filed April 23, 1925, Serial No. 25,325, and in New Zealand September 17, 1924.

This invention relates to a special construction of that well known class of devices used for emptying benzine tins into the fuel tanks of motor vehicles, and in other analogous operations, in which a spout or barrel is combined with piercer means whereby one end thereof may be forced through the end or wall of the tin and in which a shoulder is adapted to be positioned upon the inside of the aperture thus pierced and then to be drawn hard up against the inside edge of the aperture, by means of a clamping nut screwed on the outer part of the spout which clamps such edge between itself and the said shoulder.

The invention consists in a construction having special means for piercing the tin, special internal shoulder forming means, and also special clamping means, all designed to provide for the quick and secure attachment of the device and also to ensure of an effectual non-leaking attachment.

The invention is illustrated in the accompanying drawings, in which:—

Figure 1 is a side elevation of the device.
Figure 2 is a longitudinal section thereof.
Figure 3 is an outer end elevation, and
Figure 4 an inner end elevation, on an enlarged scale.

The device, as made in accordance with this invention, is formed with a barrel A of tubular form, having its outer end bent into a spout, as at A', or if desired, fitted with a tap. Its inner end is made with a double pointed piercer C shaped on the well known swan bill principle to cause a circular disc to be cut out when the piercer is pressed down upon the tin, thereby leaving an aperture through which the barrel end may then be passed.

The said barrel A, adjacent to the piercer point, is formed with two short helically extending ribs D—D', each of which is made of tapering diameter from its inner to its outer end, increasing from zero at the inner end to a straight edge $D^2$ at its outer end, and each of which extends for a distance around the circumference of the barrel, and starts and ends at points respectively diametrically opposite the start and end of the other.

These ribs are designed to cut into the edges of the hole made by the piercer in the tin top or side E when the device is pushed downward and given a turn, so that they pass through such edge and are then positioned with their straight edges $D^2$ inside the edge of the hole and engaging such edge, to form double shoulders on the inside. If desired, draining holes G may be formed in the wall of this portion.

The barrel, upon the outside of the shoulders, is made with a screw thread H for a portion of its length and a thumb nut J is provided to screw upon such thread. Combining with the nut is a metal washer K that fits loosely on the barrel, inside the thumb nut. This washer is made on its inner face with a recess K' and a rubber washer M is provided and fitted in such recess.

In use, when the inner part of the device has been placed in the tin in the manner beforementioned, the thumb nut J is screwed up, forcing the washer K against the outside face of the tin so that the shoulders $D^2$ are drawn outwards and the hole edge is clamped between the washer and the shoulders. The rubber washer M contacts with the tin E, and the recess K' in the metal washer within which it fits is so shaped that as the washer is forced in, the rubber will be compressed radially inwards all around so that a liquid tight seal is effected.

If desired, a filtering screen O of gauze material may be secured at any approved point in the length of the barrel A.

I claim:—

Discharging means for liquid containers, comprising a tubular barrel provided with a piercer at its inner end and constructed with two short, reversely-arranged helical ribs on its outer peripery extending along the barrel outwards from a point considerably beyond such piercer and with increasing diameters to form oppositely-located, straight shoulders at their outer ends, said barrel also having a screw thread on its outer periphery starting a distance beyond such shoulders; a metallic washer adapted to fit loosely on the barrel and having a recess formed in its inner face; a rubber washer fitting in said recess; and a thumb nut screwing on such threaded portion of the barrel for action upon the metallic washer, thereby to compress the rubber washer radially inwards so as to form a liquid-tight joint.

In testimony whereof, I affix my signature.

WILLIAM MARK MOORE.